June 13, 1961
H. E. ELLISON
2,988,313
ANCHOR FOR PALLET FRAME
Filed Sept. 16, 1959
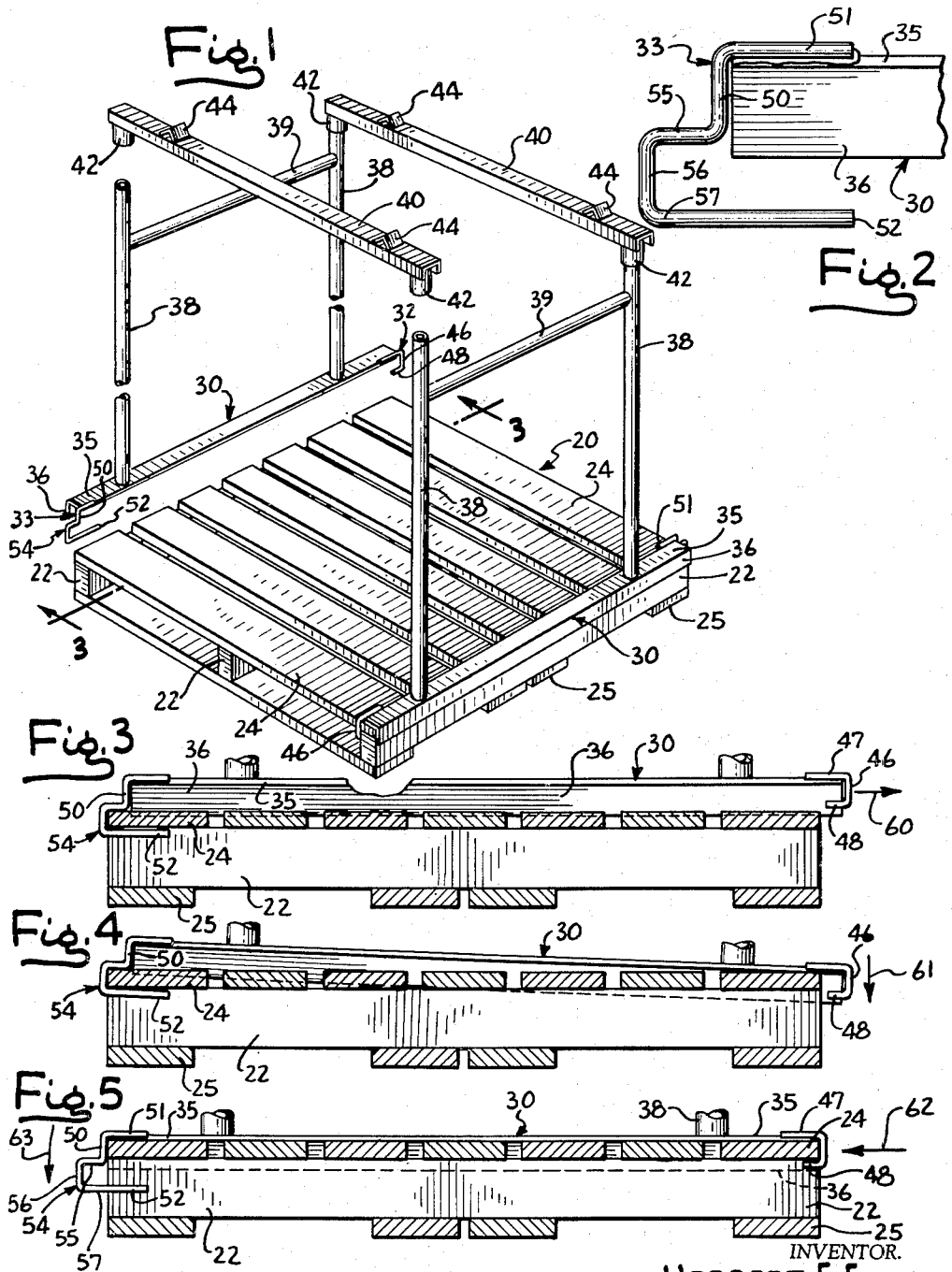
INVENTOR.
HERBERT E. ELLISON
BY
Wolfe, Hubbard, Voit & Osann
ATTYS United States Patent Office 2,988,313
Patented June 13, 1961

2,988,313
ANCHOR FOR PALLET FRAME
Herbert E. Ellison, Michigan City, Ind., assignor to The Paltier Corporation, Michigan City, Ind., a corporation of Illinois
Filed Sept. 16, 1959, Ser. No. 840,337
4 Claims. (Cl. 248—120)

The present invention relates to pallets for handling and storing articles and to an improved structure for use in stacking pallets in vertical tiers. More particularly, the invention relates to pallet tiering hardware including improved means for holding the hardware on a pallet.

Pallets of the type to which this invention relates are conventionally used in warehouse and storage areas for stacking loads of merchandise and other articles on successive levels. In many instances, the pallets are shipped with the articles stacked on them. At various points en route and even at their final destination, the loaded pallets are oftentimes handled and stored in temporary locations. As is often the case, permanent racks are not available or are undesirable for stacking the loaded pallets in warehouse areas. Without racks the loaded pallets occupy a large floor area causing undesirable congestion in the depot or warehouse.

It is an object of the present invention to provide an improved pallet tiering hardware structure of the above type which is easily mounted on and detachable from a standard commercial pallet without requiring the use of any tool or special pallet structure, and which when assembled on the pallet is structurally strong, rigid, and proof against collapse or separation of its component sections from each other or from the pallet under heavy loads and during tiering of one pallet on another.

Another object of the present invention is to provide a versatile, improved arrangement for securing pallet tiering hardware onto pallets so that successive pallets may be tiered in a strong, rigid and reliable structure. A more specific object of the invention is to provide pallet tiering hardware of the foregoing character which can be mounted on solid deck type pallets without any modification cutting or drilling of the pallet deck.

A further object of the present invention is to provide a pallet structure which is proof against accidental removal from the pallets on which it is mounted and which prevents the hardware from slipping or sliding off of the pallet deck when the pallets are tiered and when the tiered structure is being erected by use of fork-lift trucks.

Still another object of the present invention is to provide pallet tiering hardware which can be released and removed from the pallet only by deliberate motions and which does not require the use of special devices permanently secured to the pallets, and which is not permanently fastened or secured to the pallet on which it is mounted.

A related object is to provide pallet tiering hardware of the above character which can be attached to slat deck type pallets which are constructed with irregularly spaced slats.

A further object is to provide pallet tiering hardware of the above character which can be readily attached to and removed from loaded pallets.

Other objects and advantages of the present invention will become apparent to those skilled in the art as the following description proceeds taken in connection with the accompanying drawings wherein:

FIGURE 1 is a perspective view, partially exploded, of a pallet together with pallet tiering hardware embodying the present invention.

FIG. 2 is an enlarged fragmentary view of a portion of the anchoring means employed with the hardware shown in FIG. 1.

FIGS. 3, 4 and 5 are views taken substantially in the plane of line 3—3 of FIG. 1 and illustrating successive steps in mounting the hardware on a pallet.

While the invention is susceptible of various modifications and alternative constructions, a certain preferred embodiment has been shown in the drawing and will be described below in detail. It should be understood, however, that there is no intention to limit the invention to the specific form disclosed, but on the contrary, the intention is to cover all modifications, alternative constructions, equivalents, and uses falling within the spirit and scope of the invention as expressed in the appended claims.

The construction of a typical slat deck type pallet in general commercial use is shown in FIG. 1. Such a pallet generally designated by the numeral 20, comprises spaced parallel wooden stringers 22 supporting a deck formed of deck slats 24 disposed in crosswise relation and secured thereon by means of nails, screws or the like. Across the bottom of the stringers 22 there are conventionally provided a plurality of bottom slats 25.

For convenience in describing the invention, the upper surface of the pallet formed by the slats 24 will be referred to as the deck or top while the underside formed by the slats 25 will be referred to as the bottom. The extremities of the pallet between which the stringers 22 extend will be referred to as the pallet ends, and the extremities between which the slats 24 extend will be referred to as the pallet sides.

In some forms of pallets the deck is formed by a single sheet of wood or by two relatively wide slats. It is these types of pallets, with an essentially solid deck, with which the invention finds particular but not exclusive utility. The present invention also finds utility with the slat type pallets where the slats are of irregular width and the spacings between them are irregular.

In accordance with the present invention, there is provided a load carrying superstructure 28, mounted on a pallet 20 of the foregoing character as shown in FIG. 1, which superstructure and upper pallet supporting deck is formed by a pair of pallet supporting cross members 40 fixed on the upper ends of two pairs of vertical support posts 38 rigidly connected together and mounted on a base or bearing means 30 which is mounted on the pallet above each stringer and releasably attached thereto by anchor means 32, 33 embodying the present invention, which anchor means engage around the edges of the outermost slats or deckboards 24 and underneath these deckboards lying alongside of the adjacent stringer 22. In this manner the superstructure base 30 is prevented from either sliding off of the sides of the pallet or slipping in an endwise direction when pallets are successively tiered thereon.

More particularly, the removably pallet tiering structure embodying the invention, as shown in the drawings, is supported on the pallet 20 by a base or bearing means 30 which is an elongated member having at each of its ends an anchor member 32, 33 respectively for engaging with the pallet deck and stringers. The base 30 as shown in FIG. 1 is generally angle shaped in cross section and has an upper leg or bearing member 35 which is supported on the pallet deck above the outermost stringer, and a depending leg 36 which is positioned alongside of the pallet adjacent the stringer 22.

Turning first to a description of the superstructure, this portion of the hardware, which is described in detail in copending application Serial No. 584,604, filed May 14, 1956, now Patent No. 2,924,339, comprises a pair of upwardly extending posts 38 of the desired height securely supported in spaced relation on each base 30 such as by welding or any other suitable permanent or temporary mounting. A pair of such posts 38 and associated base is positioned on opposing sides of the pallet. Each pair of the pairs of posts are desirably supported or braced together by a horizontal cross brace 39 adjacent their upper ends.

The pallet tiering structure is completed by crossbars 40 which extend from side-to-side between corresponding posts of each of the two pairs of posts. One illustrative means for removably supporting the crossbars on the posts 38 which is shown comprises a socket 42 fixed to and depending from the crossbar 40 and adapted to receive the upper end of a post 38.

For purposes of alining successively tiered pallets on the crossbars 40, upstanding angle guides 44 are provided on the upper surfaces of the crossbars. These guides are engaged by the inner edge portions of the pallet stringers when a pallet is positioned thereon.

For supporting and holding the tiering hardware on the pallet, anchor members 32, 33 are provided at each end of the base 30. These members, which engage the pallet deck 24 at a point adjacent the stringers 22, are preferably the same for each base of the pair employed in a set of tiering hardware. One illustrative form of anchor means embodying the invention is shown in the drawings and comprises a first anchor member 32 fixed at one end to the horizontal bearing member 35 of the base and comprising a generally C-shaped member having a depending leg 46 secured at its upper end portion 47 to the base 35 and spaced from the depending portion 36 of the base a distance approximately equal to the thickness of a pallet stringer 22. On its lower end the depending leg 46 is provided with an in-turned member 48 which extends generally inwardly beneath the pallet adjacent to the stringer 22. The member is shown as being generally parallel to the base member 36 although it need not be. At least a portion of it should be spaced from the member 36 an amount just sufficient to snugly receive the stringer 22. The depending leg 46 and in-turned portion 48 form, with the bearing member 35 and the attaching portion 47 a generally C-shaped anchor means adapted to receive one end edge of the deck 24 as shown in FIG. 5.

At the opposite end of the base 30 the second portion of the anchor means comprises a second anchor member 33 which includes a depending leg 50 secured at one end portion 51 to the base bearing member 35. This leg 50 extends generally downwardly and is spaced from the corresponding leg 46 of the first anchor member 32. The space between the anchor member legs 46 and 50 is sufficient to receive the deck 24 and corresponds generally to the width of the deck and in some pallet constructions, to the length of the stringer 22. When the deck is between the downwardly extending leg members 46 and 50, the base 30 is restrained against longitudinal slipping from the pallet. The second anchor member 33 also includes an in-turned member 52 which extends generally inwardly beneath the deck and alongside the stringer, and both the in-turned member 52 and leg 48 are spaced from the depending base 36 an amount sufficient to receive the stringer 22 and prevent the base 30 from slipping sidewise off of the deck.

For purposes of mounting the hardware on the pallet, the second anchor member 33 is formed with a generally C-shaped portion 54 intermediate the depending leg 50 and the in-turned member 52 for receiving an end edge of the deck 24. This C-shaped member comprises an out-turned portion 55 fixed to the end of the depending leg 50, a generally downwardly extending leg 56 and a portion 57 forming an extension of the in-turned portion 52. This construction is shown in detail in FIG. 2. The legs 56, 57 and 58 can be of almost any shape, the only requirement being that no part of leg 56 reduces the space enclosed by legs 55, 56 and 57 below that necessary to allow the deck board 24 to enter far enough for attachment of the hardware to the pallet, and for leg 56 to hold in-turned member 52 in proper position with respect to leg 36. Similarly, the in-turned member can be curved in either a horizontal or vertical plane or both. The only requirement of this member is that at one or more points it be spaced from the depending base member 36 a distance slightly greater than the width of the pallet stringer 22 and that at no point is it closer to leg 36 than the spacing.

The sequence of steps involved in mounting or dismounting pallet tiering hardware having anchor means of the above described construction is shown in FIGS. 3, 4 and 5. In mounting the hardware on a pallet having a deck 24 and stringers 22, the base 30 is positioned generally above one side edge of the pallet so that an end edge of the pallet deck is engaged in the C-shaped portion 54 of one anchor member 33 and with the depending base member 36 hanging alongside of the deck. As shown in the drawings the base is so engaged with the pallet by moving it in the direction of the arrow indicated with the numeral 60. With one end edge of the pallet engaged in the C-shaped portion 54 of the anchor the opposite end of the base can be lowered onto the pallet, that is, in the direction of the arrow indicated with numeral 61, to position the first anchor member, having the depending leg 46 and in-turned portion 48, in position for engagement with the pallet. This second step of the engagement is accomplished by moving the base 30 laterally to position it directly over the pallet, that is, in the direction of the arrow indicated with the numeral 62. As the base is moved in this direction, the in-turned anchor portion 48 extends beneath the pallet deck 24 and is positioned alongside the adjacent stringer 22. At the same time, the opposite end of the base can be lowered, in the direction of the arrow indicated with the numeral 63, so that the depending leg 50 is engaged alongside the pallet deck and the in-turned portion 52 is positioned beside the adjacent stringer 22.

When the base is mounted in this position, its upper leg or bearing member 35 is securely supported on the pallet deck above the stringer while the depending leg portion 36 hangs alongside of the pallet and abuts the side thereof. It will be appreciated that by virtue of the engagement of the stringer between the depending base member 36 and the in-turned anchor members 48 and 52, respectively, an extremely rigid structure is provided without any extraneous clamping or fastening means. The base 30, and thereby the entire hardware is prevented from sliding either endwise or sidewise off of the pallet.

It will also be appreciated that to remove the hardware from the pallet a three step withdrawal must be employed, that is, the reverse procedure, as shown in FIGS. 5, 4, 3, successively, must be followed. First, the base 30 must be lifted at one end to free the anchor member 33, and then slid transversely so that the pallet deck is received in the C-shaped portion 54 of the anchor member 33. The opposite end of the base can then be lifted off of the pallet and the base can be slid in the opposite direction to free it completely from the pallet deck.

With such an anchor construction the pallet hardware cannot be knocked off or removed accidentally during tiering operations and the pallet hardware remains securely supported on the pallet at all times.

I claim as my invention:

1. Anchor means for use on a superstructure mountable on a pallet having longitudinal stringers supporting a deck, said anchor means comprising a base supportable on the pallet deck, a first member fixed on said base and engaging one edge of the pallet deck and abutting the adjacent stringer, a second member fixed on said base and engaging the opposite edge of the pallet deck and abutting the adjacent stringer, said second member including means for receiving the pallet deck upon vertical movement of the base to disengage said second member and upon transverse movement of the base to disengage said first engageable member, said first and second members when engaged with the pallet preventing disengagement of the base therefrom by a horizontal sliding movement.

2. Anchor means for use on a superstructure mountable on a pallet having longitudinal stringers supporting a deck, said anchor means comprising an elongated base supportable on the pallet deck, a first member fixed on one end of said base and engaging one edge of the pallet deck and abutting the adjacent stringer, a second member fixed on the other end of said base and engaging the opposite edge of the pallet deck and abutting the adjacent stringer, said second member including means for receiving the pallet deck upon vertical movement of the base to disengage said second member and upon transverse movement of the base to disengage said first member, said first and second members when engaged with the pallet preventing disengagement of the base therefrom by a horizontal sliding movement.

3. Anchor means for use on a superstructure mountable on a pallet having longitudinal stringers supporting a deck, said anchor means comprising an elongated base angle shaped in cross section, one leg of said angle being supportable on the pallet deck and the other leg depending alongside an adjacent stringer, a first member fixed on one end of said base and depending therefrom in spaced relation to said depending leg, said first member engaging one edge of the pallet deck and abutting the adjacent stringer, a second depending member fixed on the other end of said base and depending therefrom in spaced relation to said depending leg, said second member engaging the opposite edge of the pallet deck and abutting the adjacent stringer, said second member including means for receiving the pallet deck upon vertical movement of the base to disengage said second member and upon transverse movement of the base to disengage said first member, said first and second members when engaged with the pallet preventing disengagement of the base therefrom by a horizontal sliding movement.

4. Anchor means for use on a superstructure mountable on a pallet having longitudinal stringers supporting a deck, said anchor means comprising a base supportable on the pallet deck, a first member having a depending leg fixed on said base for engaging one edge of the pallet deck and terminating in an in-turned portion extending beneath the deck and abutting the adjacent stringer, a second member having a depending leg fixed on said base for engaging the opposite edge of the pallet deck and terminating in an in-turned portion extending beneath the pallet deck and abutting the adjacent stringer, said second member including an outwardly extending generally C-shaped portion intermediate said depending leg and said in-turned portion for receiving said opposite edge of the pallet deck upon vertical and transverse movement of the base an amount sufficient to disengage said first engageable member, said first and second members when engaged with the pallet preventing disengagement of the base therefrom by a horizontal sliding movement.

References Cited in the file of this patent

UNITED STATES PATENTS

| 2,922,530 | Skeppstedt | Jan. 26, 1960 |

FOREIGN PATENTS

| 580,762 | Canada | Aug. 4, 1959 |